United States Patent

[11] 3,589,194

[72] Inventor Daniel O. Noorlander
 Fresno, Calif.
[21] Appl. No. 861,284
[22] Filed Sept. 26, 1969
[45] Patented June 29, 1971
[73] Assignee Milk Producers, Inc.
 San Antonio, Tex.

[54] TESTING DEVICE AND METHOD
 8 Claims, 2 Drawing Figs.
[52] U.S. Cl. .................................................. 73/389,
 119/14.14
[51] Int. Cl. ...................................................... G01l 7/00
[50] Field of Search............................................ 73/389,
 420; 119/14.14

[56] References Cited
UNITED STATES PATENTS
3,125,066 3/1964 Smith et al.................. 119/14.14

*Primary Examiner*—Donald O. Woodiel
*Attorney*—Beveridge & DeGrandi

ABSTRACT: There is disclosed a device and method for testing automatic milking machines and parts thereof for inflation wear, teat message, basic pulsator malfunctions, vacuum instability as the cow milks, and vacuum recovery capacity. The device contemplated is an elongated frustoconical body member having an axially centered bore communicating with a vacuum gauge. A gradually tapering conical surface is provided on the body member with indicia at selected intervals thereon for indicating depth of penetration into a teat cup inflation element and thus the condition of the element and its likelihood to cause injury to the cow.

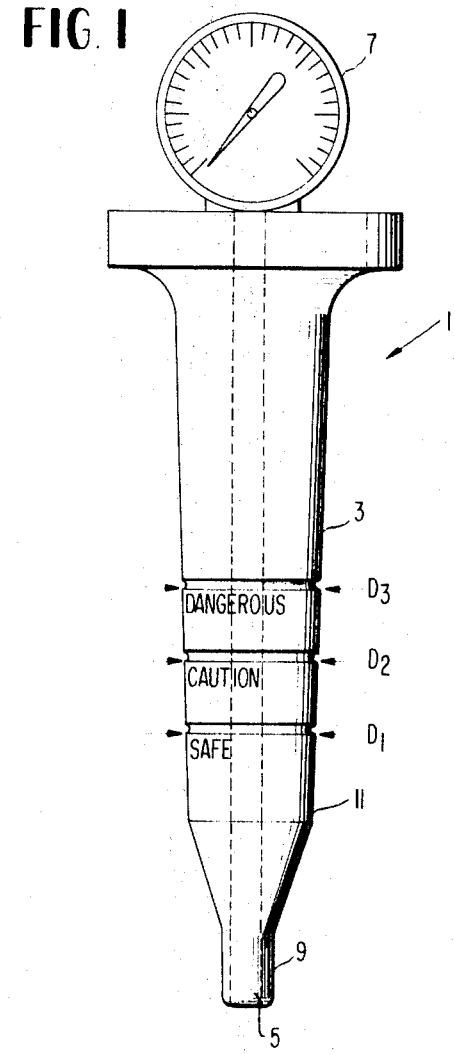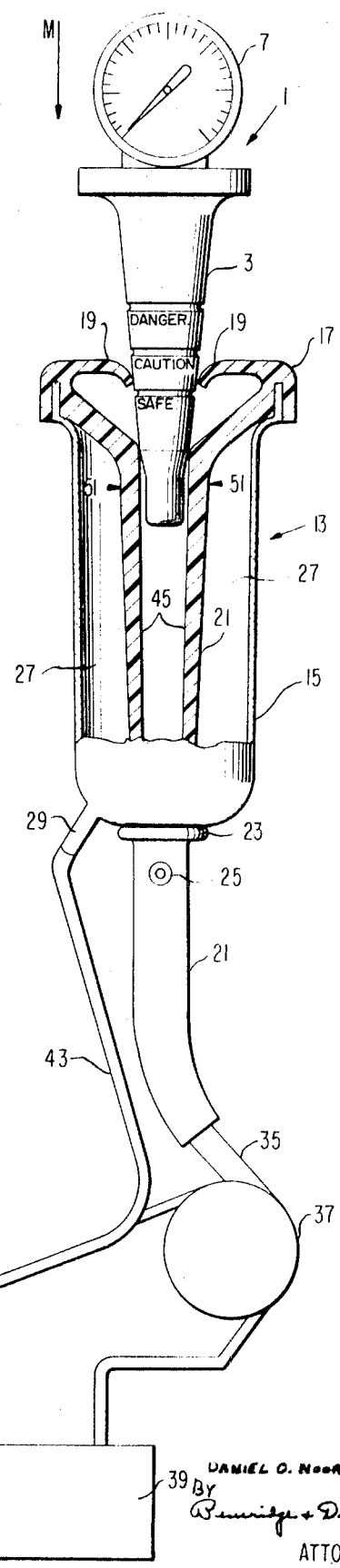

TESTING DEVICE AND METHOD

This invention relates to testing devices and methods. More particularly, this invention relates to devices and methods for performing the five fundamental tests on automatic milking machines.

All milking systems differ in milking efficiency and their ability to properly massage the cow's teat. Massage is necessary to force the blood and lymph fluids to circulate through the teat capillaries and the lymph vessels. Unfortunately, there is a tendency even among the most efficient automatic (i.e. mechanical) milking systems to wear out and/or fluctuate during their operation which causes not only a lessening of their milking efficiency but also a lessening of the massage of a cow's teat even to the point of causing injury to the cow. A further discussion of the specific problems within a milking system which cause loss of efficiency and injury to cows by improper massage may be found in Noorlander et al., *Mechanics and Production of Quality Milk*, Democratic Printing Co. (1965), the disclosure of which is incorporated by reference.

As disclosed in the above-cited reference, milking efficiency and teat massage are linked primarily to the quality of the operation of the vacuum-pulsation system and the quality of the teat cup inflation element. For example, if there is improper pulsation and/or vacuum fluctuation, the vacuum can cause damage to the delicate tissues of the interior of a cow's teat, thus predisposing the mastitis. As another example, if the teat cup element is too large or is worn out, a teat may be improperly massaged thereby and/or otherwise injured by undue penetration into the cup.

It is therefore apparent that the art is in need of a device and method for periodically testing milking systems to ascertain their milking efficiency and safety, particularly with respect to the quality of their vacuum-pulsation system and teat cup inflation element.

The subject invention hereinafter disclosed, fulfills this need in the art by providing both a device and method for testing milking efficiency and safety of a mechanical milking system. In addition, the devices and methods contemplated by this invention are particularly useful in performing the five fundamental tests of system recovery, pulsation, vacuum stability, teat massage, and teat cup quality at the milking site and without, in most instances, dismantling the milking system so that the farmer himself may test his own equipment.

Generally speaking, the devices contemplated by this invention which fulfill the above-described need in the art comprise an elongated frustoconically shaped circular body wherein there is indicated by an appropriate marking on the circumference thereof the point at which the diameter of the body is twenty-nine thirty-seconds inch ± one sixty-fourth inch. This point indicates that critical point at which penetration of the device inserted with a force of 5 pounds must be stopped by a teat cup inflation mouthpart in massage area in order to insure adequate massage of the teat and to minimize vacuum damage. Preferably the frustoconical body is so designed that this critical diameter exists at a point 1 13/16 inches from the smaller end of said body.

The body may also be provided with further indicia which warns that harm may be occuring to the teat and that harm is very likely to have already occurred. Such indicia may be provided at points where the diameter of the body is fifteen-sixteenths inch ± one sixty-fourth inch and thirty-one thirty-seconds inch ± one sixty-fourth inch respectively and which preferably occur at a point respectively from the smaller end of the body of 2 5/16 inches and 2 13/16 inches.

It has been found that the above dimensions are critical in that they cover the vast majority of cows existing on dairy farms today. That is to say that twenty nine thirty-seconds inch diameter is meant to provide safety for the smallest usual teat which is found generally to occur among cows. In this respect and as is well known in the art, this diameter is meant to test those usual cup elements now currently in use, which cup elements were manufactured so as to provide safety for the vast majority of cows but because of wear now allow for undue penetration. However, this diameter can also be used to test a cup element which is new but may have been improperly designed so as to initially allow for undue penetration. Thus, the subject device, because of the above critical diameter, is found to be able to test both old and new devices to indicate safety for the vast number of cows now found throughout the dairy industry. It is understood, however, that if a cow to be milked has one or more teats of unusually small diameter, the critical dimension above-stated is no longer critical and a new dimension must be used (along with a specially designed cup element) to test for the cow's safety.

Although this device in the form described above is capable of testing for proper teat cup inflation element design (i.e. element quality and wear) it is rendered more versatile by a further embodiment of this invention which provides in said body a longitudinal orifice extending from the smaller tip of said body through the larger end thereof and into engagement with a conventional pressure (vacuum) gauge. As will be described hereinafter, this added feature allows the dairyman at the milking site to carry out the other four basic tests on his mechanical milking system, in most instances, without dismantling the equipment.

Referring to the drawings attached hereto there is illustrated preferred embodiments of this invention as follows:

FIG. 1 is a front plan view of a preferred testing device in accordance with this invention.

FIG. 2 is a front plan partially sectioned view of the testing device of FIG. 1 inserted into a conventional teat cup inflation element in combination with a typical mechanical milking system.

Referring to FIG. 1 there is provided in a preferred embodiment of this invention a testing device 1. All dimensions are preferably ± one sixty-fourth inch as given. Testing device 1 is formed of a frustoconical section 3, a longitudinal, concentric orifice 5 and a conventional vacuum pressure gauge 7 such as that made by U.S. Gauge Corp. No. 12121-1. Provided at the lower or smaller end of section 3 is an insertion nipple 9 approximately three-eighths inch in diameter. Nipple 9 tapers outwardly to frustoconical surface 11 at a diameter of seven-eighths inch. Frustoconical section 3 tapers outwardly from this point until it reaches $D_1$ wherein a grooved marking is provided to indicate safe penetration. At point $D_1$, the diameter of the right circular cross-sectional area of frustoconical section 3 is twenty-nine thirty-seconds inch. As illustrated, and for immediate reference during testing, the word SAFE may be printed on the circumference of section 3 near point $D_1$.

In a like manner, section 3 is provided further with two other indications at $D_2$ and $D_3$ respectively. $D_2$ is located where the diameter of the right circular cross-sectional area of section 3 is fifteen-sixteenths inch. $D_2$ is marked CAUTION and indicates that if penetration into an inflation cup occurs to this point, the cup mouth member and massage area is beginning to wear or borders upon improper design and should not be used on smaller teated cows and/or will need replacing in the very near future. $D_3$ is located where the diameter of the right circular cross-sectional area of section thirty-one thirty-seconds inch. $D_3$ is marked DANGEROUS and indicates that point at which penetration will result in improper teat massage and possible vacuum damage thereto.

Referring to FIG. 2, testing device 1 is inserted into a conventional teat cup inflation element 13. Element 13 is comprised of an outer rigid container 15 and an inner teat contacting element 17. Inner element 17 is comprised of a flexible mouth portion 19, a tubular massaging and milking portion 21, vacuum sealing flanges 23 (the inner flange not shown, but similar to outer shown flange) and bleeder orifice 25. Although any conventional teat cup inflation element may be generally used for the purposes of this invention, preferred inflation elements are those disclosed in U.S. Pat. Nos. 2,997,980; 3,308,788; and 3,476,055, the disclosures of which are incorporated herein by references.

As can be seen, there is provided between container 15 and tubular element 21 a pulsation chamber 27 which chamber is pulsed through entrance orifice 29 attached to pulsing system 31 of convention design and vacuum pump 33 also of conventional design. In accordance with well-known techniques, the pulsation of vacuum within chamber 27 as well as the vacuum drawing on line 35 and tubular member 21 causes, when a teat is inserted into inner element 17, milk to flow and tubular member 21 to pulsate so as to gently provide the necessary massaging action to the teat. Line 35 is connected to claw 37 which for convenience has been illustrated as having only one line 35 so as to milk only one teat, but which in practice is so formed as to operate up to four elements 13 in either simultaneous or alternating syncronization for more efficient milking. Claw 37 in a conventional manner delivers milk to collecting reservoir 39 from which the milk is further processed in accordance with well-known techniques.

As is clear to the skilled artisan members 13, 31, 33, and 39 form a conventional mechanical milking system which may now be tested for its milking efficiency and safety by using testing device 1 in the following manner. As stated, testing device 1 is extremely versatile in that it may be used to perform the five basic tests upon a mechanical milking system. The tests are performed as follows:

A. SYSTEM RECOVERY CAPACITY TEST

Device 1 is placed, as illustrated in FIG. 1, into sealing relationship with element 17. Vacuum pump 33 is then activated so as to pull a vacuum to its normal milking level using control 41 as indicated on gauge 7. Air is then admitted into the direct vacuum system such as by opening another teat cup element on claw 37 until the vacuum drops a substantial amount. The admission is then stopped and the time required to regain the normal milking level of vacuum is measured. A time greater than 3 seconds for recovery for most conventional milking systems indicates that the vacuum system being used is under capacity or overloaded and/or control 41 is malfunctioning. The vacuum system may then be redesigned or otherwise corrected so that recovery well occurs within the 3 second limit.

B. PULSATION SYSTEM TEST

Device 1 is inserted into line 43, usually by removing line 43 from orifice 29 and inserting nipple 9 into the end thereof. The pulsation rate and differential is then viewed on gauge 7 for its quality and consistency. Generally speaking in order to insure adequate pulsation of tubular member 21 and thus adequate teat massage, the pressure should reach a low of zero momentarily and then recover rapidly and uniformly to the normal milking level. If such does not occur, there is indicated pulsator malfunction or low air reserve which should be promptly corrected to avoid injury to the teat of the cow.

C. VACUUM STABILITY (INCLUDING MILKING VACUUM) TEST

Device 1 is inserted as illustrated in FIG. 2 and as described in Test A while the cow is being milked by three other cup elements 13 also connected to claw 37. An operating milking vacuum being drawn by line 35 on tubular member 21 is indicated. If the system is operating efficiently and safely, the vacuum reading should remain substantially steady and preferably should not vary over about 2 inch Hg. If a fluctuation greater than about 2 inch Hg does occur this indicates inadequate vacuum to sufficiently pulsate tubular member 21 for adequate massage of teat and/or abnormal flooding of the milk in line 35 and/or 21 which may cause backflow of the milk into the teat and thereby contaminate with bacteria the inner delicate tissues in the orifice opening of the teat. In this respect above-cited U.S. Pat. No. 3,476,085 describes how orifice device 25 may be used to prevent or limit such flooding. In this respect, the use of this device in the subject test aids in the proper design of orifice 25, so as to prevent plugging and provide an adequate safety factor against flooding.

D. ADEQUATE TEAT MASSAGE

Device 1 is inserted into inner element 17 as illustrated in FIG. 2 and as described in Test A above. Tubular member 21 is disconnected from line 35 and mouth suction is applied to the end of member 21 until the walls 45 of tubular member 21 within pulsation chamber 27 touch, i.e. are pulled together. (In this respect, it is noted, that the mechanical milking system has been turned off but has not been otherwise dismantled.) The vacuum on gauge 7 necessary to collapse walls 45 is then noted. This figure is then subtracted from the low value of the milking vacuum. This gives the residual or massage vacuum, i.e. that vacuum which is available for and which serves to effect the massage of the teat. Generally speaking from about 6—9 inches Hg residual vacuum are necessary to effect adequate massage. If the residual vacuum measured by this test is greater than about 9 inches Hg, the delicate protective keratin lining the teat orifice is likely to be removed, thus enhancing bacteria invasion and the likelihood of mastitis. On the other hand, if the residual vacuum measured by this test is less than about 6 inches Hg there will be inadequate massage.

E. TEAT CUP INFLATION ELEMENT QUALITY TEST

This test has been described hereinabove with respect to penetration so as to indicate either undue wear of a properly designed teat cup or an improperly design teat cup. In a preferred manner of carrying out this test, device 1 is inserted loosely as generally illustrated in FIG. 2 into element 17. The system at this stage is totally shut down but is not dismantled. Five pounds of pressure is then applied to device 1 in the direction of the arrow M. By viewing the penetration indicators, the wear and/or design of the mouth portions 19 and massaging area generally represented a 51 of tubular member 21 is indicated. If too great a penetration occurs, injury and contamination of the teat is likely and the cup element should be replaced.

Many other features, variations, and modifications of this invention will become apparent to the skilled artisan once given the above disclosure. Such features, variations and modifications are considered to be a part of this invention, the scope of which is to be determined by the following claims:

I claim:

1. A device for testing teat cup inflation elements and vacuum systems in a milking machine comprising,
    an elongated frustoconically shaped circular body section having an axially centered bore therein, the ratio of diameter of the base of said elongated frustoconical body section being slightly greater than the diameter of the smaller end thereof to form a gradually tapering conical indicating surface and to form a seal at any section thereof to the teat entrance orifice of the teat cup inflation element,
    indicia means on said indicating surface for indicating the condition of the teat cup inflation element, and
    a vacuum gauge connected to said axially centered bore.

2. The device defined in claim 1 including a further frustoconically shaped circular body section, the base diameter of said further section being equal to the small diameter end of said elongated conically shaped body section, the ratio of the base diameter of said further frustoconical section to the diameter of the small end thereof being substantially greater than the ratio of the diameter of said elongated frustoconical member to form a guiding protuberance therefor, and said further frustoconical body having an axially centered bore therein aligned with the bore in said elongated frustoconical sections.

3. The device defined in claim 2 including a cylindrically shaped section having a diameter equal to the diameter of the small end of said further frustoconical section and an axially centered bore therein aligned with the bore in said further frustoconical section.

4. The invention defined in claim 3 wherein said frustoconically shaped sections and said cylindrically shaped sections are integral.

5. The invention defined in claim 2 wherein said indicia means is constituted by a plurality of lines, the first being spaced from the base diameter of said further section, and wherein the diameter of said conical section at said first line is twenty-nine thirty-seconds inch plus or minus one sixty-fourth inch.

6. A method of testing the condition of a teat cup inflation element as used in a milking machine comprising the steps of,
placing an elongated frustoconically shaped body section in juxtaposition to the teat entrance orifice of a teat cup inflation element, said frustoconical body section having a right circular cross-sectional diameter of about twenty-nine thirty-seconds inch plus or minus one sixty-fourth inch spaced a short distance from the small end thereof,
applying a force of about 5 pounds pressure to said frustoconical section, determining the extent of penetration of said frustoconical element into said teat entrance orifice as a measure of the quality of said inflation element.

7. The invention defined in claim 6 wherein the surface of said frustoconical element is provided with indicia means, the first of which is at a right cross-sectional area of said frustoconical section having a diameter of about twenty-nine thirty-seconds inch plus or minus one sixty-fourth inch, a second of which is at a right circular cross-sectional area having a diameter of about fifteen-sixteenths inch plus or minus one sixty-fourth inch and a third of which is at a right cross-sectional area having a diameter of about thirty-one thirty-seconds inch plus or minus one sixty-fourth inch.

8. A device for testing the condition of a teat cup inflation element in a milking machine comprising,
an elongated conical body member, said body member having a base end of right circular cross-sectional area having a diameter greater than thirty-one thirty-seconds inch plus or minus one sixty-fourth inch and a small teat cup orifice entry end which is less than twenty-nine thirty-seconds inch plus or minus one sixty-fourth inch, indicia means on the surface of said body member comprising at least a first indicia line located at a right circular cross-sectional area of said member having a diameter of twenty-nine thirty-seconds inch plus or minus one sixty-fourth inch, a second indicia line located at a right circular cross-sectional area having a diameter of fifteen-sixteenths inch plus or minus one sixty-fourth inch and a third indicia line located at a right cross-sectional area of said member having a diameter of thirty-one thirty-seconds inch plus or minus one sixty-fourth inch.